(12) United States Patent
Cudd et al.

(10) Patent No.: US 8,762,521 B2
(45) Date of Patent: Jun. 24, 2014

(54) MONITORING THE DISTRIBUTION OF SOFTWARE

(75) Inventors: Richard Cudd, London (GB); Sumir Karayi, London (GB)

(73) Assignee: 1E Limited, London (GB)

( * ) Notice: Subject to any disclaimer, the term of this patent is extended or adjusted under 35 U.S.C. 154(b) by 225 days.

(21) Appl. No.: 13/047,357

(22) Filed: Mar. 14, 2011

(65) Prior Publication Data
US 2012/0239798 A1     Sep. 20, 2012

(51) Int. Cl.
*G06F 15/173*     (2006.01)
(52) U.S. Cl.
USPC ............ 709/224; 717/171; 717/176; 715/742
(58) Field of Classification Search
USPC .................. 717/173, 174, 177, 176; 719/313; 706/61
See application file for complete search history.

(56) References Cited

U.S. PATENT DOCUMENTS

| | | | | |
|---|---|---|---|---|
| 7,840,490 | B1* | 11/2010 | Sellers et al. | 705/59 |
| 7,913,247 | B2* | 3/2011 | Diederichs | 717/173 |
| 8,201,162 | B2* | 6/2012 | Okachi et al. | 717/173 |
| 2002/0199117 | A1 | 12/2002 | Nagaya | |
| 2003/0163382 | A1 | 8/2003 | Stefanik et al. | |
| 2005/0216519 | A1 | 9/2005 | Mayo et al. | |
| 2006/0080656 | A1* | 4/2006 | Cain et al. | 717/174 |
| 2007/0168919 | A1 | 7/2007 | Henseler et al. | |
| 2008/0071722 | A1* | 3/2008 | Wookey | 706/61 |
| 2008/0140537 | A1 | 6/2008 | Powell | |
| 2010/0100778 | A1* | 4/2010 | Sullivan | 714/57 |
| 2011/0087760 | A1* | 4/2011 | Fode et al. | 709/221 |
| 2011/0271275 | A1* | 11/2011 | Ochi et al. | 717/177 |
| 2012/0054774 | A1* | 3/2012 | Jonnagadla et al. | 719/313 |

FOREIGN PATENT DOCUMENTS

EP     1 174 814 A1     1/2002

* cited by examiner

*Primary Examiner* — Dustin Nguyen
(74) *Attorney, Agent, or Firm* — EIP US LLP (57) ABSTRACT

A computer implemented method to monitor the distribution of software to computers on a network is provided. The network has a data source, for example a systems management tool, which stores data relating to downloads of software. It is desirable for the purpose of operating the network economically to monitor the distribution of software to users. The systems management tool is accessed to determine the number of the computers on the network which have received a particular item of software. That number is compared with a threshold number which is small compared to the number of computers on the network. If the number is less than the threshold that is taken as an indication that the particular item of software has been distributed to the computers by a download as a result of one or more individual requests by users of the computers. Monitoring such indications can be used to estimate the cost of dealing with individual requests and that provides information for assisting a decision to provide a portal for making software available to users. Such an indication may be used to automatically make the software available on a portal to be downloaded by other users, if such a portal is provided.

20 Claims, 9 Drawing Sheets

MONITORING THE DISTRIBUTION OF SOFTWARE

FIELD OF THE INVENTION

The present invention relates to monitoring the distribution of software to computers in a network.

BACKGROUND OF THE INVENTION

It is known to collectively distribute software to a collection of computers in a network. An administrator defines the collection of computers which are to receive the software and the software is downloaded in a mass distribution. The distribution is carried out using a systems management tool an example of which is Microsoft's Configuration Manager.

Users on a network may require software which is additional to that preinstalled on their computers and additional to any collectively distributed to the computers. In some organizations, a user may request the software he or she wants by sending a request to a network administrator and/or seeking approval from a manager. If the request is approved the software may be downloaded to, and installed on, the user's computer via the systems management tool. The approval process is manual and expensive to operate. It is thus desirable to minimize the use of a manual approval process.

It is known to provide on an enterprise (corporate) network a web portal which allows users to download and install preapproved software, thus reducing the cost of approving individual requests for software. However, even with such a portal, some requests for software may still need to be processed manually because the portal does not provide access to the requested software. Again it is desirable to minimize the use of a manual approval process.

Networks can be very large with hundreds or even thousands of computers which may be spread over many different locations. It is difficult to record all manual requests for software.

SUMMARY OF THE INVENTION

In accordance with one aspect of the present invention, there is provided a computer implemented method of monitoring the distribution of software to computers on a network, the network having a source of data stored on a computer of the network identifying software downloaded to other computers and the computers to which the software is downloaded, the method comprising:

using a computer of the network to access, the data source to determine the number of the computers on the network which have received a particular item of software, compare that number with a threshold number which is small compared to the number of computers on the network, and if the said number is less than the threshold, indicate that the particular item of software has been distributed to the computers by a download as a result of one or more individual requests by users of the computers.

Embodiments of the present invention advantageously automate the use of information available from a systems management tool to both identify downloads of software and to distinguish, with a reasonable degree of accuracy, between collective downloads and downloads resulting from "one-off" requests for software. Such a request may have required manual approval and preparation for approval. This typically involves reading the request, finding the available software, checking the licenses, check for approval and finally preparing the distribution in the systems management tool. It is also possible that some requests would not have needed approval or have been approved.

Embodiments of the present invention advantageously provide information about distribution of software on the network and downloads which are in response to user requests (and which requests have been processed at least partly manually) by using information normally present in the data source, which may be for example a systems management tool, avoiding the need for other systems of identifying software.

In an embodiment of the invention, the number of the computers on the network which have received a particular item of software, is determined as the number which receive the item within a predetermined time window. The time window is a period chosen to assist in distinguishing between "one off" requests and other requests for software. The time window may be in the range 1 to 48 hours around a set date, or 1 to 24 hours which may occur within one day or over two successive days.

By providing this information, a manager is enabled to plan cost savings. An example of the invention automatically produces a report identifying the software deemed to be the subject of one-off requests and providing a cost estimate for processing the requests. The manager is enabled to decide to add a portal to the network if one is not present. If a portal is present, the manager is enabled to decide whether to authorize the addition of the requested software to the portal.

Another example of the invention automatically adds to the portal software deemed to be the subject of a "one-off" request. Doing this reduces future burden on administrators and managers. A report may be provided indicating an estimated cost saving resulting from identifying the software and adding it to the portal.

In accordance with another aspect of the present invention, there is provided a computer readable medium on which is stored a monitoring engine which when run on a suitable computer system causes the system to:

access the systems management tool to determine the number of the computers on the network which have received a particular item of software, compare that number with a threshold number which is small compared to the number of computers on the network, and if the said number is less than the threshold, indicate that the particular item of software has been distributed to the computers by a download as a result of one or more individual requests by users of the computers.

In accordance with a further aspect of the present invention, there is provided a monitoring engine stored on a computer readable medium which, when executed by a computer in a network comprising a network systems management tool, adapts the computer to:

a) access the systems management tool and find data recorded by the tool relating to provision of software packages to one or more computers of the network, b) identify from the data recorded by the tool the software provided to identified computers of the network, c) distinguish between the collective and non-collective provision of identified software computers on the network.; and d) identify the software which is provided non-collectively.

In accordance with a yet further aspect of the present invention, there is provided a system of distributing software, the system comprising:

a) a network of computers
b) a portal accessible from the network and configured to make available to users of the network one or more software packages, and
c) a monitoring engine for monitoring use of the network to find software packages installed on the network and not available from the portal.

Further features and advantages of the invention will become apparent from the following description of illustrative examples of the invention which is made with reference to the accompanying drawings.

DETAILED DESCRIPTION

Figure 1:
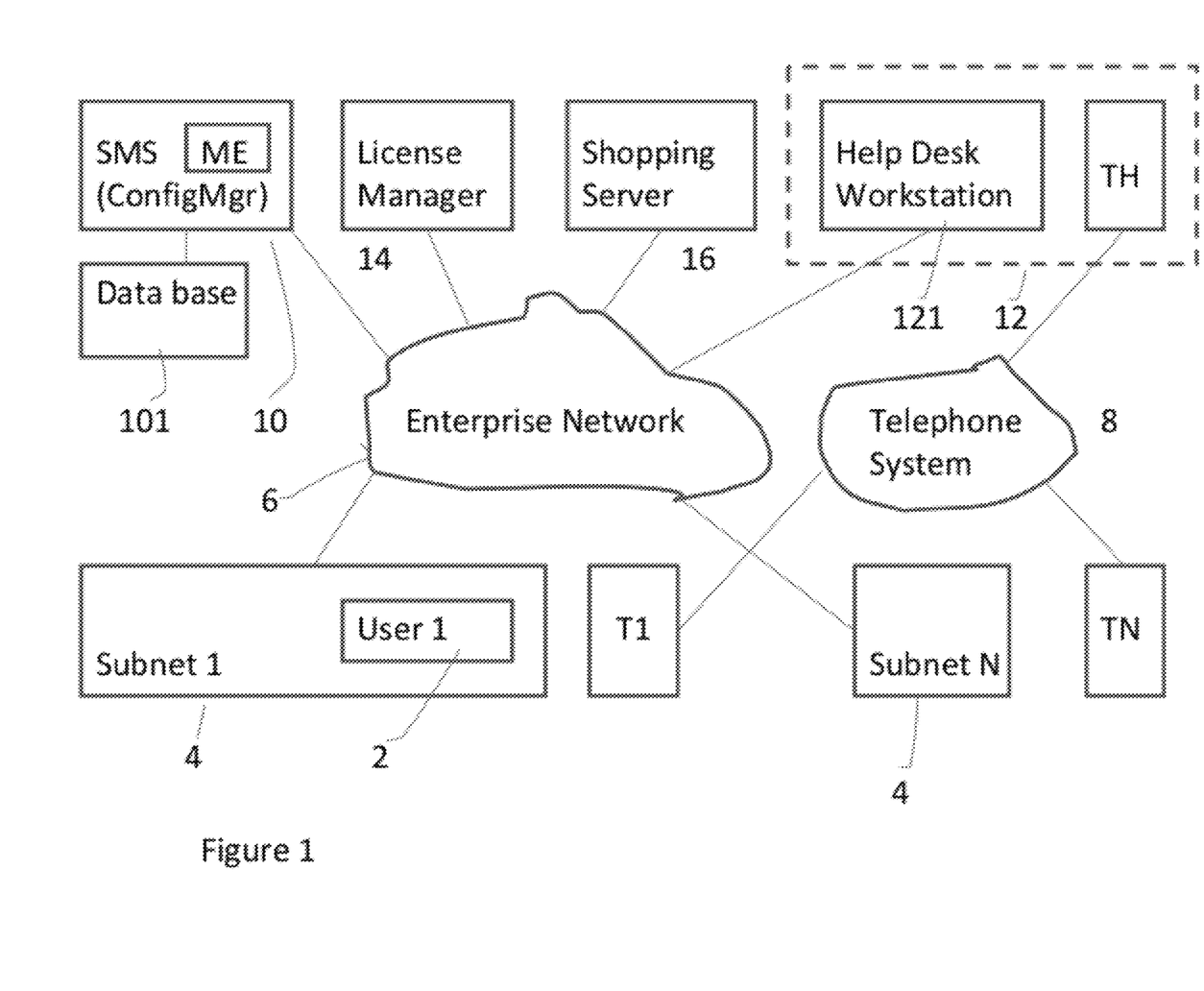
FIG. 1 is a schematic block diagram of a network according to an embodiment of the present invention.

The network of FIG. 1 is not a public network: it is an enterprise network, private to an enterprise. The enterprise may be a private company for example.

Users of the network have computers 2, which may be on subnets 4, are linked by the network symbolized at 6. Each user may have a telephone T linked to a telephone system 8. The telephone system may be part of the network 6 or be a separate system.

The network comprises a systems management tool 10. An example of such a tool is a Configuration Manager (Config-Mgr), also formerly known as Systems Management Server (SMS), provided by Microsoft Corporation. Other companies also provide systems management tools. The tool 10 has a database 101 storing data relating to the configuration of the network. The tool 10 is used for downloading all software to computers on the network. The term "software" includes patches for, and updates of, software already installed on the network, and new software packages.

The network also has a license manager 14 for recording data relating to the licensing of software installed on the network.

The network also has a help desk 12 run by one or more administrators and equipped with a telephone TH and a workstation 121 linked to the network. The workstation 121 can access the Configuration Manager 10 and the license manager 14 via the network 6.

The administrator(s) can initiate and control the collective distribution of software, for example patches and updates, to a collection of computers. The administrators select the computers which are to be members of the collection. The collection typically comprises a plurality of computers and may comprise a large number of computers but could comprise only one or a small number of computers.

The network of FIG. 1 has a web portal, here referred to as a shopping portal 16, which users can access to request the download of software which has been pre-approved by the relevant manager(s) of the enterprise to be available to users. The portal in this example does not make available software which is typically present on all or most of the user's computers; examples of such software, which is often provided pre-installed on a computer, include Microsoft Windows, Microsoft Office, amongst other commonly used software. The portal provides links to requested software which is made available by, and downloaded by, the Configuration Manager 10. When a download takes place, the license manager updates its records and the Configuration Manager records data relating to the event of downloading.

Having such a portal, which allows the automatic download of pre-approved software to users and the automatic recording of the download event by the Configuration Manager and by the license manager, reduces the cost of running the network and avoids the use of manager's time in reviewing and approving requests for software by the users.

Figure 2A:
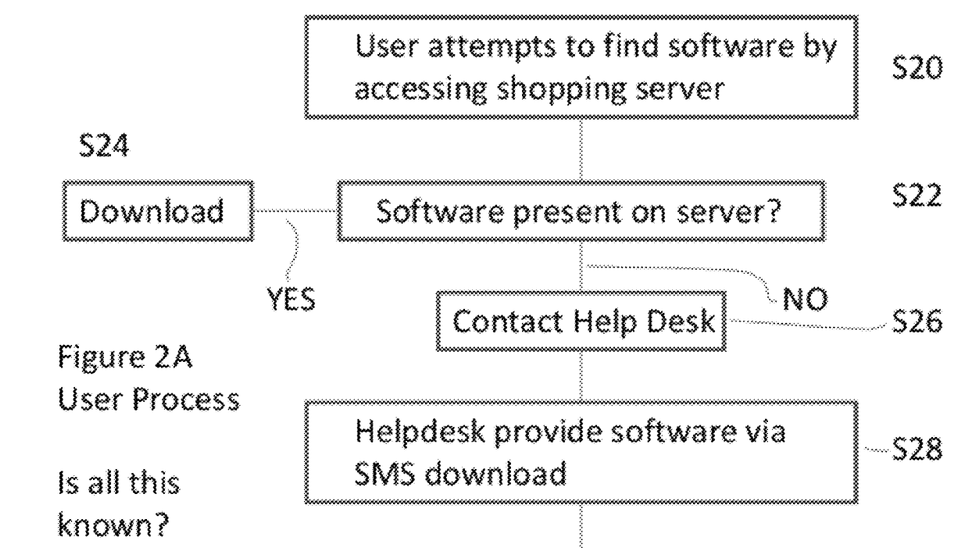
FIG. 2A is a flow chart of a process of distributing software on the network of FIG. 1 according to an embodiment of the present invention.
Figure 2B:
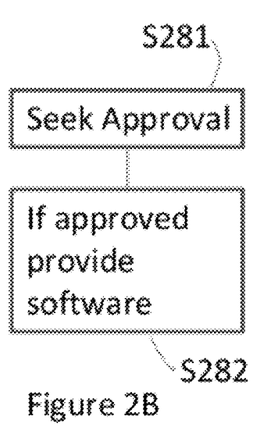
FIG. 2B is an illustrative flow chart of a process carried out by a helpdesk according to an embodiment of the present invention.

However, individual users may from time to time require software which is not available via the shopping portal 16. Referring to FIG. 2A, a user may attempt to find S20 software by accessing the shopping portal, and if the software is present S22, the software is automatically downloaded S24. If the software is not available the user contacts S26 the helpdesk and asks for the software. The user may contact the helpdesk by telephone T or by email via the network 6, or in some other way. The helpdesk may provide S28 the software by download from the Configuration manager. As shown in FIG. 2B, the helpdesk may seek approval S281 for providing the software and provide it S282 only if approved.

If the software is provided S28, the download event is recorded by the Configuration Manager and the license manager is updated as indicated at S283.

Figure 2C:
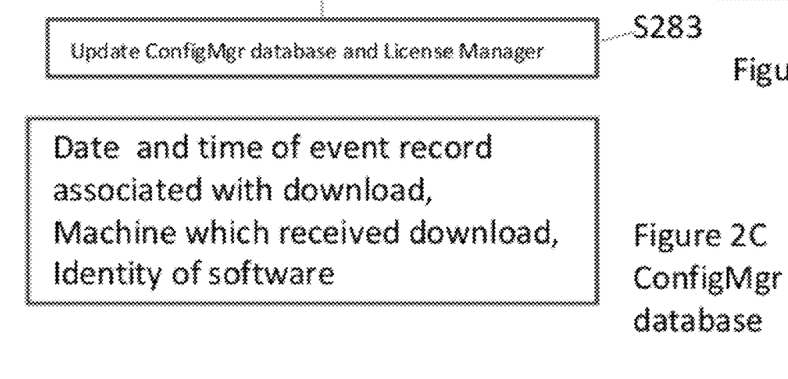
FIG. 2C is a schematic diagram of a database according to an embodiment of the present invention.

The Configuration Manager records, for a download event, at least the time and date of the event, the identity of the software and the identity of the computer which receives the software as shown in FIG. 2C.

The process of requesting and approving software which is not available via the portal 16 is inefficient.

Embodiments of the present invention provide a monitoring engine ME which accesses the event records of the Configuration Manager and uses them to distinguish between collective downloads of software to a collection of computers and downloads of software not available via the shopping portal. This information is used in some embodiments to decide whether to add software subject to "one-off" requests to the software available via the portal. The addition may be automatic. The monitoring engine needs to access data stored by the configuration manager. The monitoring engine may be on any computer on the network but it is convenient to run it on the same server as the Configuration Manager.

Figure 3A:
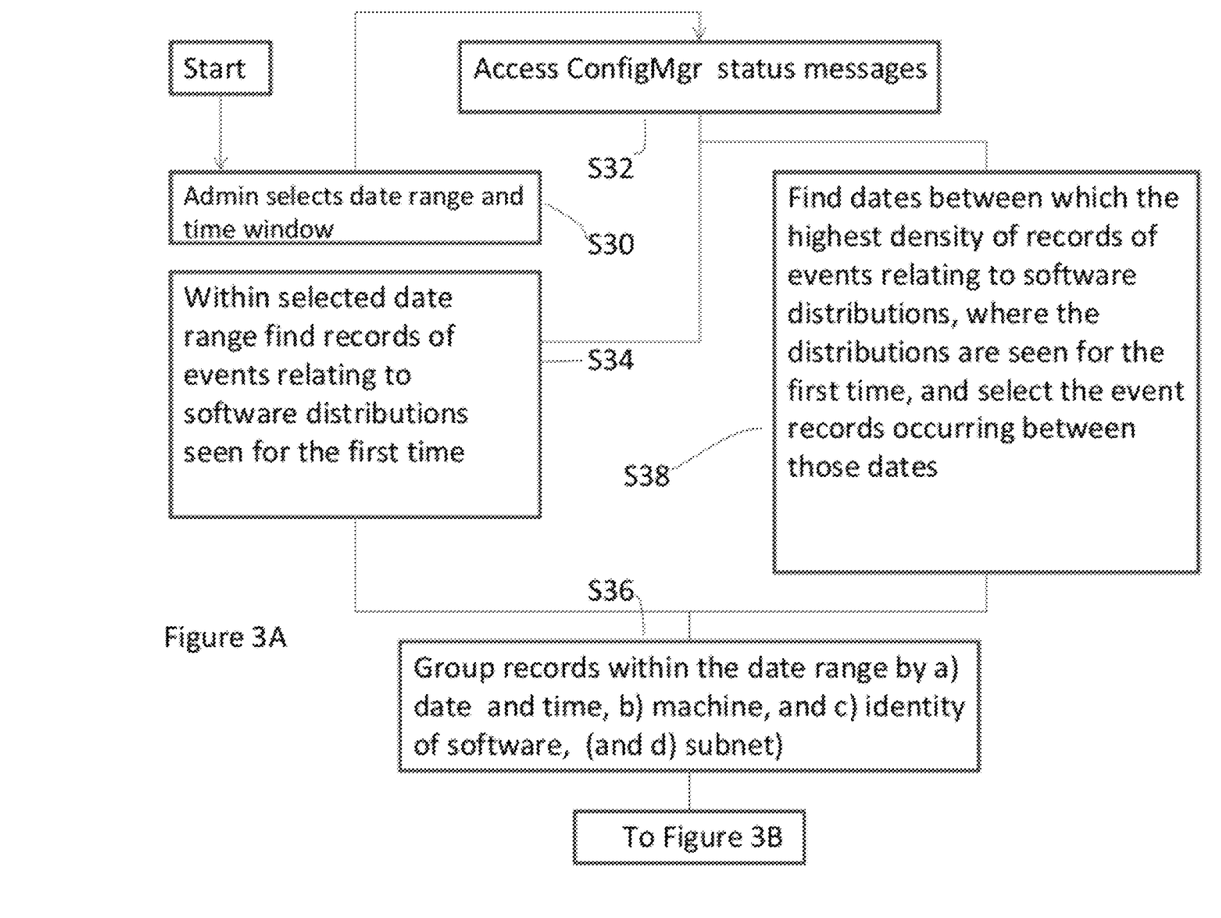
FIGS. 3A and 3B are a flow chart of a process, in accordance with an embodiment of the invention, of monitoring distribution of the software in the network of FIG. 1.

Referring to FIG. 3A, the monitoring engine is activated (Start) by an administrator. In one version, the administrator selects S30 a date range or other time interval within which the engine accesses S32 the ConfigMgr and examines S34 event records of the Configuration Manager relating to software distributions in which computers have received software for the first time (and thus are not repeats of previous distributions made before the selected time interval). The data needed to establish that is recorded by the Configuration Manager. In step S30 the administrator also sets a time window which is used as one of the criteria for determining if a request is a "one-off" request. An example of a time window is a working day, 12 hours on a particular day, or any other time interval chosen by the administrator. Alternatively, the time window is preconfigured in the software. The time window is preferably 24 hours or less but more than an hour. The monitor extracts S36 for each such event at least the following data relating to the event:
 a) the time of the event (e.g. the date and time of downloading of software), b) the identity of the machine to which software was downloaded, and c) the identity of the software.

In an alternative version, instead of the administrator selecting a date range, the monitoring engine accesses S32 the ConfigMgr and selects S38 a date range by finding the highest number of download events that occur in a given time interval. Referring to FIG. 3C, that may be achieved by building S320 a histogram of the numbers of download events occurring in successive time intervals, for example successive days or successive weeks, and choosing S322 the interval having the largest number of events. Then the events within that chosen interval are examined S324 to find event records of the Configuration Manager relating to software distributions in which computers have received software for the first time (and thus are not repeats of previous distributions). The alternative version then proceeds to step S36.

Figure 3B:
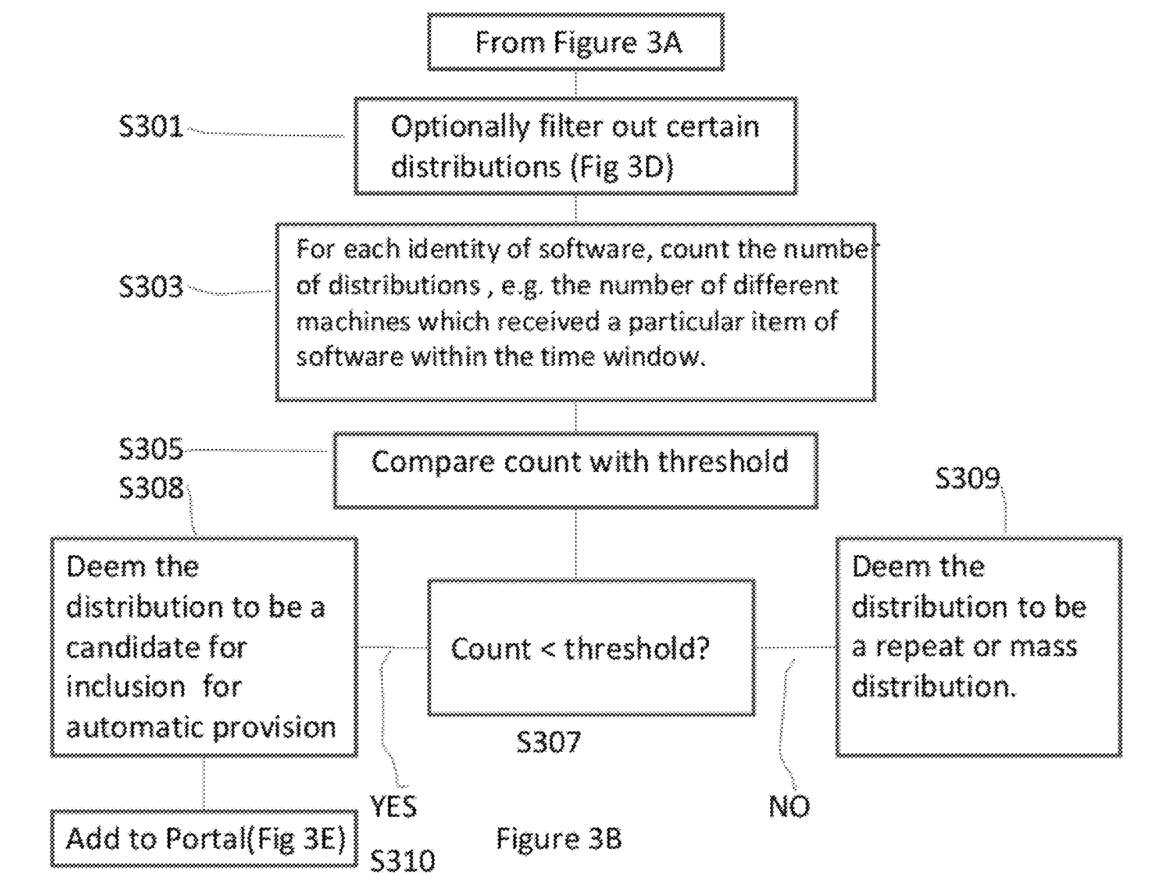
Figure 3C:
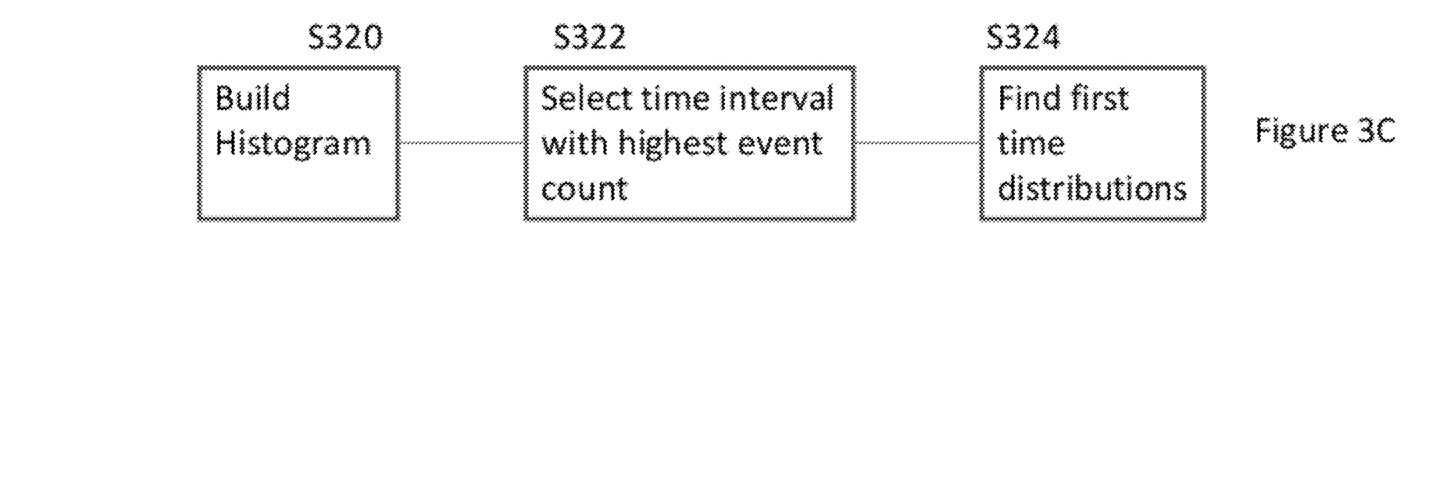
FIG. 3C is a flow chart illustrating an implementation of step S38 in FIG. 3A.
Figure 3D:
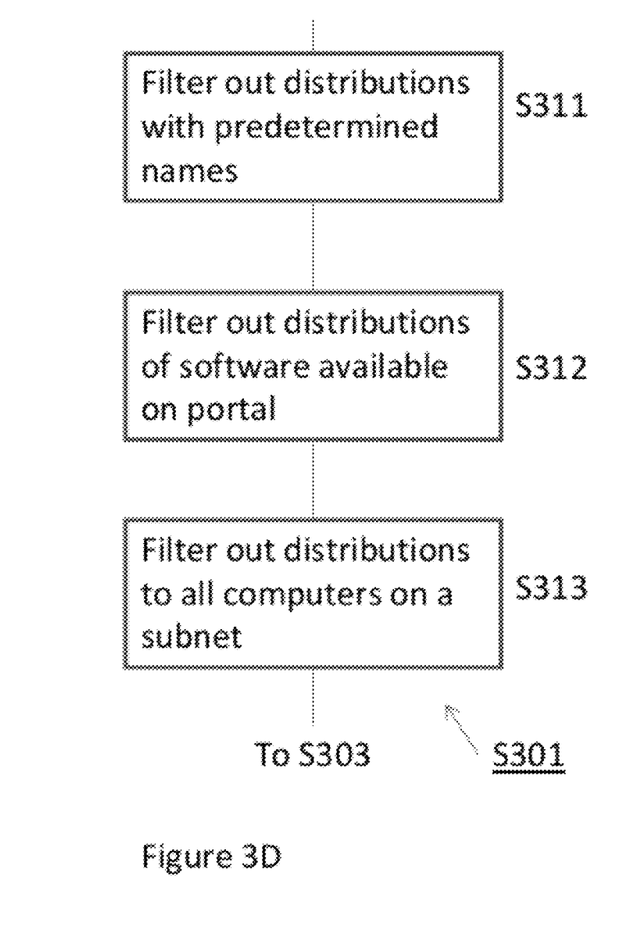
FIG. 3D is a flow chart of illustrative implementations of step 5301 in FIG. 3B.

Referring to FIG. 3B, the event records of Step S36 may be filtered S301 to omit certain distributions of software as will be described with reference to FIG. 3D. The result of step S36, or of steps S36 and S301, is a set of event records of the form software identity, date of download and machine identity. As a simple example, the event records may be:
 Appl, 10 January 2011, 0900, machine 1;
 Appl, 10 January 2011, 1100, machine 2;
 Appl, 10 January 2011, 1600, machine 3.
 Step S303 counts the number of computers which receive the same software within the selected time window of 12 hours. In the example above 3 computers receive App 1 in the same time window.
 Step S305 compares the count with a threshold. If S307 the count is less than or equal to the threshold then at step S308, Appl is automatically added to the software available via the shopping portal. Otherwise it is deemed S309 to be part of a collective download of software.

Adding it to the portal makes it available for automatic download and installation via the systems management tool, improving the efficiency of running the network.

The threshold is a number which is small relative to the number of user's computers active on the network. It may be an empirically determined number.

Figure 4:
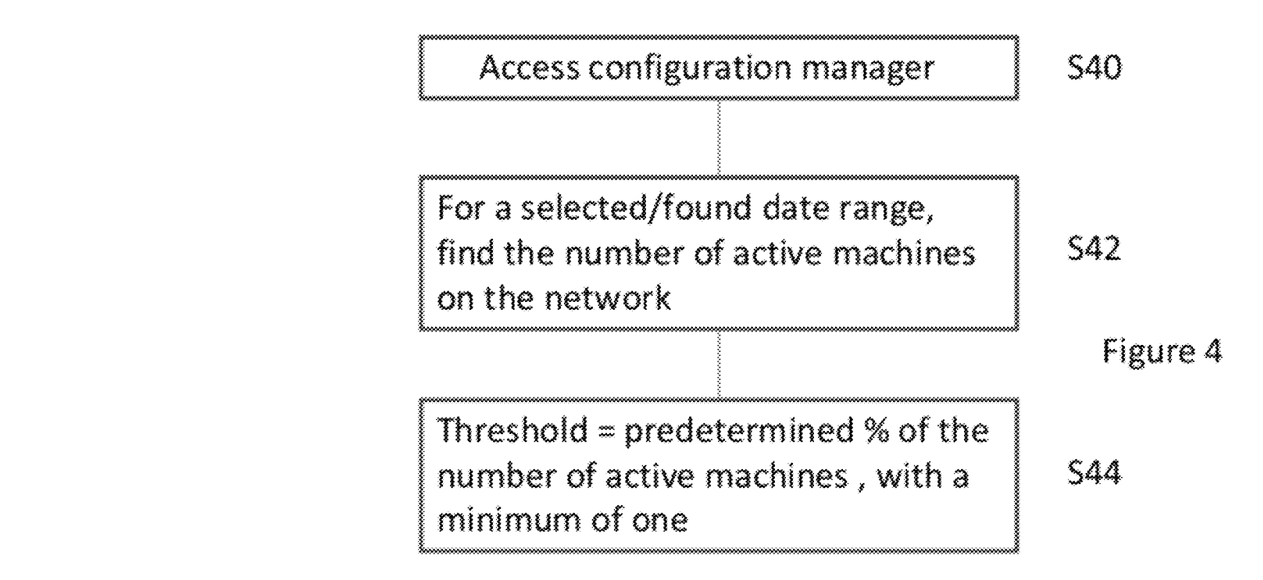
FIG. 4 is a flow chart of an illustrative method of providing a threshold value used in the process of FIG. 3.

In the example of FIG. 4, the number is calculated by accessing S40 the configuration manager, determining S42, from data available from the configuration manager the number of computers active on the network within the time interval selected by the administrator in step S30 of FIG. 3A or by the monitoring engine in step S38 of FIG. 3A and setting S44 the threshold as the number of active computers corresponding to a preset small percentage of the computers subject to a minimum of one computer. An empirically determined percentage is 0.1%. The percentage may be in the range about 0.01% to about 1%, for example about 0.05% to about 0.5%.

The number of active computers may be the number active before the start of the selected time interval and which are still active during and up to the end of the interval.

By way of example, if the percentage is 0.1% and the number of active computers is 10, then the threshold is 1. If the number of active computers is 1000 the threshold is 1. If the number of active computers is 10,000 the threshold is 10.

It will be appreciated that this example may provide false results. It assumes that if a download of a particular software package (Appl) is made to only 10 or fewer computers out of 10,000 for example, then it is the result of 10 or fewer "one-off" requests by users and is neither a collective download nor available on the shopping portal. However, it is possible that a collective download of software, which is made to only 10 or fewer computers, may give a false result. However that is considered to be satisfactory because the result may simply be the addition to the shopping portal of approved software to the portal or it may be already available to all users via the portal because it is likely that such software would be made available on the portal if it is to be collectively downloaded to some users.

False results may be reduced by the filtering of step S301. Referring to FIG. 3D, one or more of the following filtering steps may be carried out.

In step S311, distributions with predetermined names are filtered out. The predetermined names include names typically indicative of updates and patches. Examples of commonly used names include update, patch, Q1212, q1234, hotfix, amongst others.

Step S312 filters out distributions of software which is available via the shopping portal. When software made available by the shopping portal is distributed by the systems management tool, a flag may be set, or other data provided, in the systems management tool database indicating that the distribution was automatically created by the system, and so indicating that the software is available via the portal. That enables the filtering step S320 to be added to the process of FIG. 3B.

As shown in FIG. 1 computers may be organized in subnets. The configuration manager has data identifying the subnet to which a computer belongs. In a modification of the process of FIG. 3, the data from the configuration manager is additionally grouped in step S36 by d) subnet. A step S313 may be provided which filters out distributions which are made to all machines on a subnet on the ground that such a distribution is likely to be a collective distribution.

Steps S311, S312 and S313 may be carried out in any order and one or two of them may be omitted although it is preferred to carry out step S312.

Figure 3E:
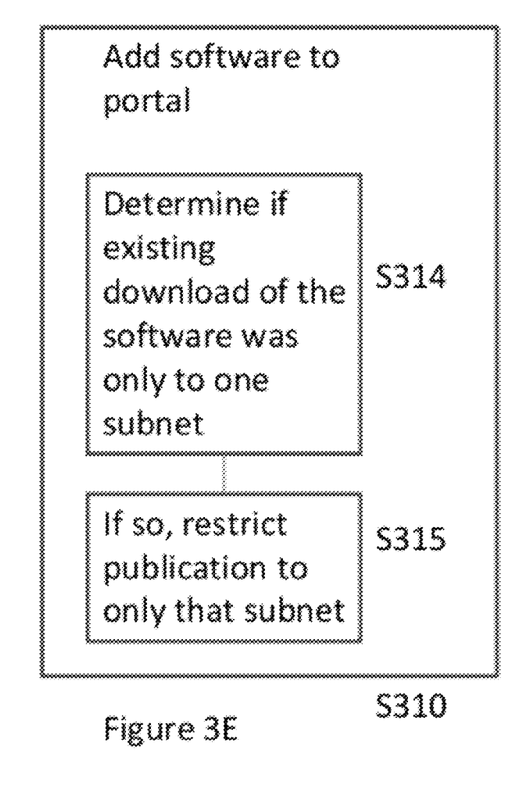
FIG. 3E is a flow chart of an illustrative implementation of step 5310 in FIG. 3B.

Referring to FIGS. 3B and 3E, a step S310 may take place in which software added to the portal is automatically made available only for downloading to, and installing on, computers of a particular subnet if it has been the subject of a one-off request only from one or more users on that subnet. In other words if there has only ever been a one-off request made by machines in a particular subnet or functional unit, the software is published only to other machines in that subnet. In this aspect the scope of the publication is controlled based on a previous download of the software. Thus referring to FIG. 3E, the step of adding software to the portal may include the step S314 of determining if an existing download of software was only to one subnet and, if so, restricting S315 the publication of the software to that subnet. ("Publication" here means making the software available via the portal.)

The examples of the invention are not limited to subnets. Instead of identifying and downloading software to subnets, any subset of computers for example a functional unit, an operation unit, or user group which is identifiable from data stored by the configuration manager may be identified and software downloaded to it for installation.

Figure 5:
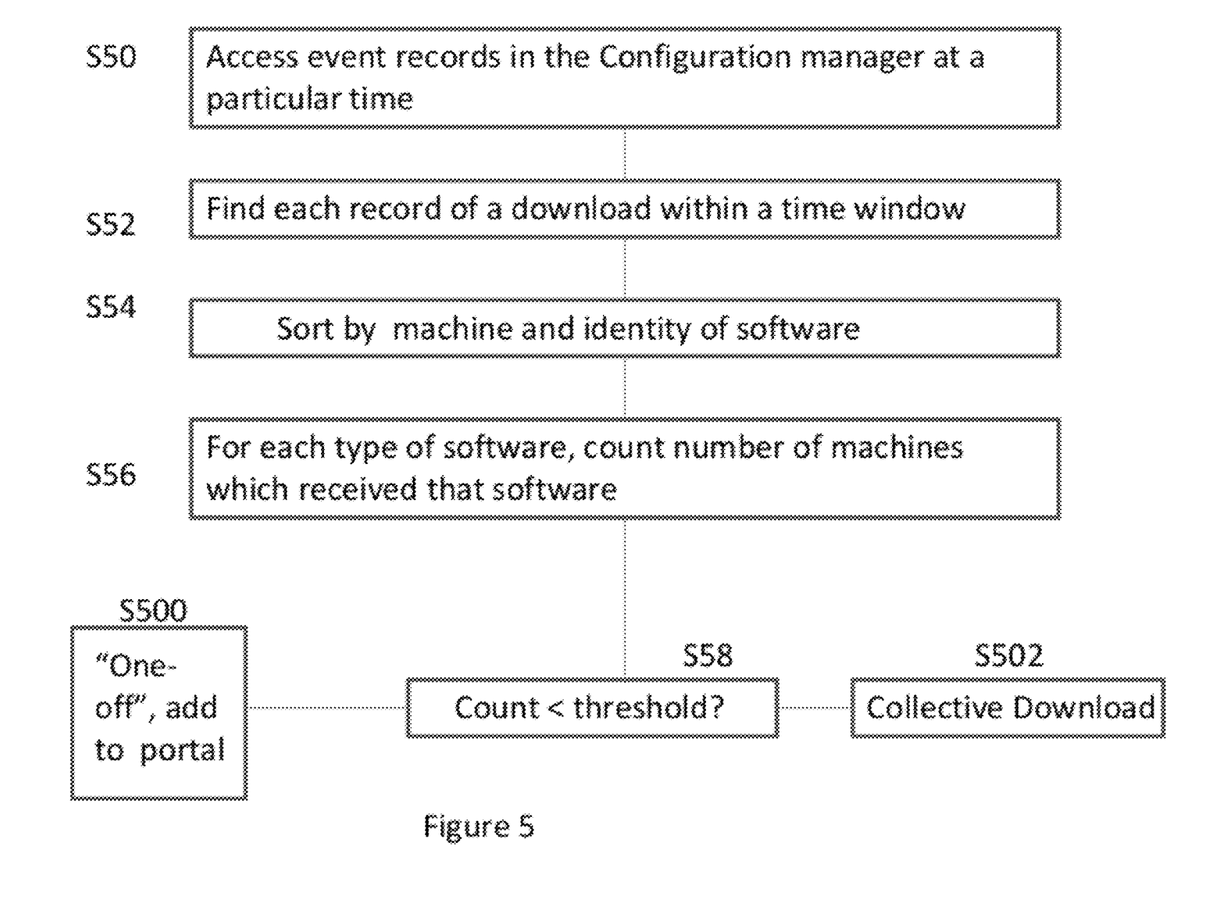
FIG. 5 is a flow chart of a modification of the method of FIG. 3.

FIG. 5 sets out another alternative. Consider that a time interval selected in FIG. 3A is calendar day ending at midnight. A possible simple example result of the process of FIG. 3A may be:

Appl, 10 January 2011, 23.58, machine 1;
Appl, 10 January 2011, 23.57, machine 2;
Appl, 10 January 2011, 23.59, machine 3;
Appl, 11 January 2011, 00.01, machine 4;
Appl, 11 January 2011, 00.02, machine 5;
Appl, 11 January 2011, 00.03, machine 6.

That may be interpreted as two separate downloads each to only 3 computers, one on the 10th and the other on the 11th. If the threshold is, say, 4 the downloads on the 10th would be interpreted as being "one-offs" and Appl should be added to the portal. However the six downloads may be part of a collective download to six machines taking place over midnight and Appl should not be added to the portal.

In the alternative of FIG. 5, the monitoring engine accesses S50 the event records of the configuration manager and finds records of downloads occurring over a specific time frame, for example the previous month. Other time frames may be chosen. For each record of a download the engine searches S52 for other downloads occurring within a time window extending before and after the time of occurrence of the download. For example the time window may extend 12 hours before the occurrence and 12 hours after or any other appropriate time window. In step S54, the found records are grouped by software, time window and machine.

For each software identity, the number of computers receiving that software in the time window is counted S56. If S58 the count is less than or equal to the threshold S58, the software is added to the portal S500: otherwise it is deemed to be a collective download S502.

In the examples described above, the shopping portal is present in the network and software is added to the portal automatically if the software is deemed to be the subject of "one-off" requests. However, the shopping portal may not be present in the network. Also, even if the portal is in the network, decisions to add software to the portal may not be automatic.

Figure 6A:
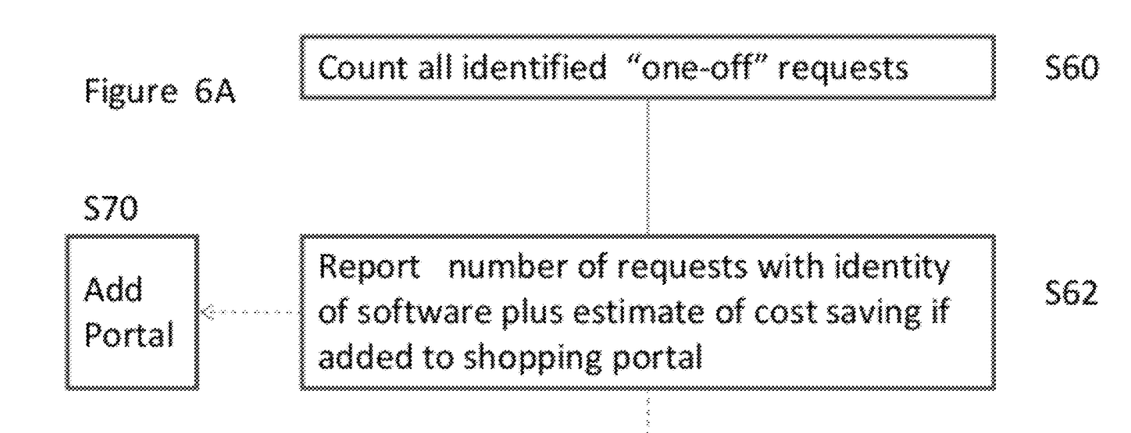
FIG. 6A is a flow chart of another modification of the method of FIG. 3.

Referring to FIG. 6A, assume that the portal 16 is present on the network. Step S60 counts the number of "one-off" requests which have been detected by the process of FIG. 3: in other words the number of times a count is less than the threshold as determined at step S307. In step S62 a report is produced identifying the software associated with the "one-off" requests together with a cost estimate of the savings made by automatically adding the requested software to the portal. The estimate may be based on the number of requests and an estimate of the cost of processing each request manually. The report may be produced automatically. The report may identify the cost saving associated with each software item and a total cost for all software items.

Figure 6B:
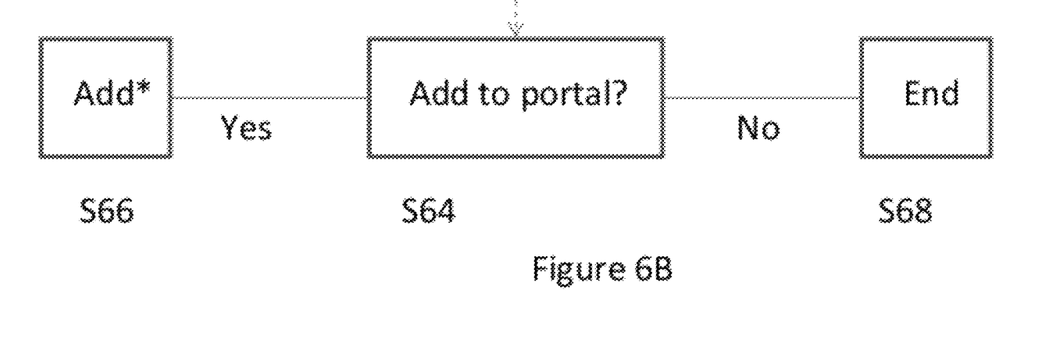
FIG. 6B is a flow chart of a modification of the process of FIG. 6A.

In another version of the process as shown in FIG. 6B instead of automatically adding software to the portal as set out in steps S307 and S308 in FIG. 3, the software may be added only after the report has been produced and reviewed by a manager and/or a network administrator as indicated by S64 and S66.

In yet another version, the portal 16 is not part of, or present on, the network. The process of FIG. 3 and of steps S60 and S62 of FIG. 6A is automatically carried out to produce the report of step S62. A manager and/or network administrator reviews the report and on the basis of the report decides on the basis of the estimated cost savings whether to make S70 the portal available on the network. The examples described above refer a systems management tool or configuration manager having a database which stores management data relating to the network, the data including the data used by the present invention. However the invention is not limited to such a systems management tool or configuration manager. Any source of data providing event records including at least the date and time of download and installation of software, identifying the software and the machine to which it was downloaded and preferably other data as set out above may be used.

The examples set out above refer to an administrator setting various parameters, for example a date range and a time window. Any such parameter may be preset by a programmer or otherwise set other than manually by an administrator.

Embodiments of the present invention also provides one or more carriers on which is stored a monitoring engine which when run on the network of FIG. 1 causes the network to operate as shown in FIGS. 3A and 3B optionally as modified by one or more of FIGS. 4 to 6. A carrier may be a signal, a communications channel, or a computer readable medium. A computer readable medium may be an article for example: a tape: a disc for example a CD or DVD: a hard disc: an electronic memory; or any other suitable non transitory carrier or data storage medium. The electronic memory may be a ROM, a RAM, Flash memory or any other suitable electronic memory device whether volatile or non-volatile.

Figure 7:
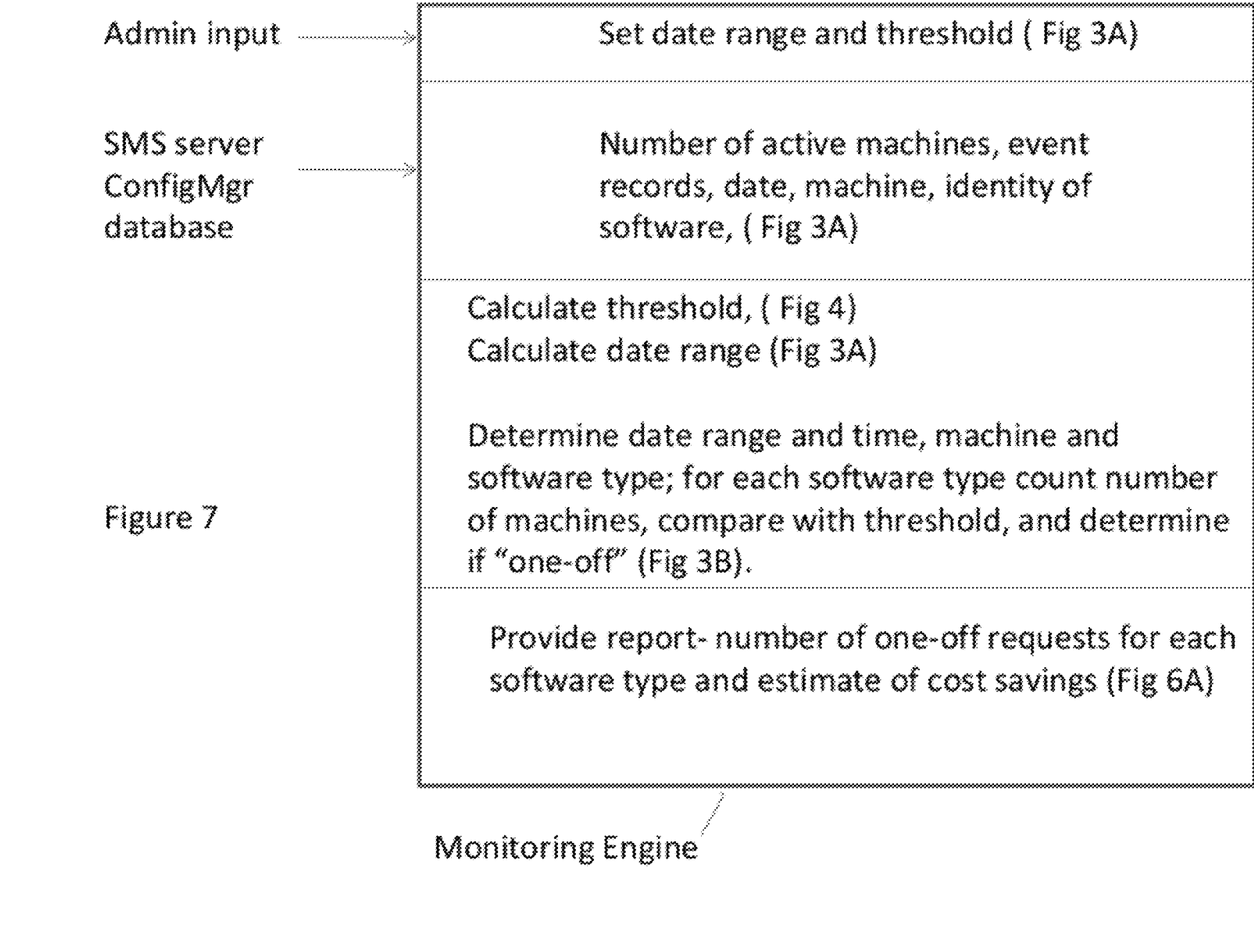
FIG. 7 illustrates features of an example of a monitoring engine useful in the process of FIG. 3.

Referring to FIG. 7, an example of the monitoring engine has the following features:

A process for setting a date range, a time window, and a threshold value, or data such as a percentage which allows the threshold to be set. The date range and threshold may be set by an administrator. The date range may be determined by the monitoring engine. See for example FIG. 3A.

A process of accessing a systems management tool, for example a Configuration Manager, to access event records. Optionally the process also accesses the tool to determine the number of active machines on the network. See for example FIG. 3A.

A process for examining event records relating to downloads to determine for each download at least the date and time of the download, the identity of the software and the machine which received the software.

A process for determining if a download is the result of a "one-off" request. See for example FIGS. 3A and 3B.

Optionally a process for producing a report. See for example FIG. 6A.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims. The features of the claims may be combined in combinations other than those specified in the claims.

What is claimed is:

1. A computer implemented method of distinguishing, in a network, between collective downloads of items of software and non-collective, user-initiated downloads of items of software, the method comprising:
   retrieving download statistics from a data source, the download statistics indicative of download activity in the network, wherein the download statistics include information indicative of time of each download, location within the network of each download, and the item of the software downloaded in each download;
   determining, based on the download statistic, the number of computers on the network which have received a copy of a particular item of software within a predetermined time window;
   determining a total number of computers active on the computer network;
   calculating a threshold number based on a predetermined percentage of the determined total number of computers active on the computer network;
   comparing said number of computers which have received the copy of the particular item with the threshold number; and
   if said number of computers is less than said threshold number, indicating that the particular item of software has been distributed to the computers by a non-collective user-initiated download,
   wherein the network comprises a portal configured to automatically make item of software available to a user on request by the user, and wherein the method further comprises automatically making the particular item of software available via the portal, if there has been an indication that the item of software has been distributed to the computers by a non-collective, user-initiated download.

2. The method according to claim 1, wherein the percentage is between about 0.01% to 1%.

3. The method according to claim 1, wherein the percentage is 0.1%.

4. The method according to claim 1, wherein the download statistics further include event records indicative of a software distribution made to a computer for the first time.

5. The method according to claim 1, wherein the predetermined time window is a selected date range.

6. The method according to claim 5, wherein the selected date range is selected manually.

7. The method according to claim 5, wherein the selected date range is selected by a computer which examines the event records to find a date range having the highest number of distribution events.

8. The method according to claim 1, further comprising, for each event record of a software distribution, finding other such records occurring within the predetermined time window before and after the date of the event record and examining the found records.

9. The method according to claim 1, further comprising omitting, from the determination of the number of the computers on the network which have received the copy of the particular item of software, software having preset names indicative of updates and patches.

10. The method according to claim 1 further comprising omitting, from the determination of the number of the computers on the network which have received the copy of the particular item of software, distributions of software to all computers on the same subnet of the network or to all computers in the same user group or operation unit.

11. The method according to claim 1, further comprising generating a report relating to indications that the particular item of software has been distributed to the computers by a download as a result of one or more individual requests by users of the computers.

12. The method according to claim 1, further comprising installing a portal on the network, the portal being configured to automatically make software available to a user on request by the user.

13. The method according to claim 1, further comprising making the item of software available via the portal only to a subset of the computers of the network, the subset being identifiable from data stored by the systems management data source and selected based on a previous non-collective, user-initiated download of the particular item of software.

14. The method according to claim 13, wherein the particular item of software is made available only to a functional unit of the network, the functional unit being identifiable from data stored by the data source, the functional unit including a computer to which the software was previously downloaded in a non-collective, user-initiated download.

15. The method according to claim 1, wherein the time window is between about 1 to 24 hours on or about a predetermined date.

16. The method according to claim 1, wherein the time window is between about 1 to 48 hours on or about a predetermined date.

17. A non-transitory computer-readable medium having computer-executable instructions stored thereon, which, when executed by a computer processor cause a computer device to perform a method of distinguishing, in a network, between collective downloads of items of software and non-collective, user-initiated downloads of items of software, the method comprising:
   retrieving download statistics from a data source, the download statistics indicative of download activity in the network, wherein the download statistics include information indicative of time of each download, location within the network of each download, and the item of the software downloaded in each download;
   determining, based on the download statistic, the number of computers on the network which have received a copy of a particular item of software within a predetermined time window;
   determining a total number of computers active on the computer network;
   calculating a threshold number based on a predetermined percentage of the determined total number of computers active on the computer network;
   comparing said number of computers which have received the copy of the particular item with the threshold number; and
   if said number of computers is less than said threshold number, indicating that the particular item of software has been distributed to the computers by a non-collective user-initiated download,
   wherein the network comprises a portal configured to automatically make item of software available to a user on request by the user, the instructions stored by the medium being configured to automatically make the particular item of software available via the portal, if there has been an indication that the particular item of software has been distributed to the computers by a download as a result of a non-collective, user-initiated download.

18. The computer-readable medium according to claim 17, wherein the percentage is in the range 0.01 to 1 percent.

19. The computer-readable medium according to claim 18, wherein the percentage is 0.1 percent.

20. The computer-readable medium according to claim 17, wherein the step of retrieving download statistics from the data source comprises examining event records to find any record of a software distribution made to a computer for the first time.

* * * * *